UNITED STATES PATENT OFFICE.

EDWARD GUDEMAN, OF CHICAGO, ILLINOIS.

METHOD OF UTILIZING GLUTEN TAILINGS.

SPECIFICATION forming part of Letters Patent No. 695,720, dated March 18, 1902.

Application filed October 17, 1901. Serial No. 78,939. (No specimens.)

*To all whom it may concern:*

Be it known that I, EDWARD GUDEMAN, a citizen of the United States, and a resident of the city of Chicago, Cook county, Illinois, have invented certain new and useful Improvements in Methods of Utilizing Gluten Tailings, of which the following is hereby declared to be a full, clear, and exact description.

In the manufacture of corn-starch, more especially from maize, it is familiar practice to soak the grain in water and after cracking the kernels by grinding to immerse the mass in a high gravity—e. g., starch solution for release of the plumules or germs which rise to the top and float away. Freed from its germs the residue is finely reground, and after sieving in the presence of a copious water-supply to abstract the bulk of the fiber the residue is run, with the water, over a series of shallow tables or gutters, upon which the starch granules settle, while the associated gluten and the fiber remnant pass off as tailings to be later deprived of the water excess in suitable gravity-tanks or centrifugals. Before removal of the water at the settling-tanks the solids in the tailings stand, e. g., at one to three ounces per gallon, but afterward range as high as, e. g., eight to fifteen ounces per gallon. The dried tailings are known as "gluten meal" or, if admixed with bran, either wet or dry, the compound becomes one of the customary sorts of cattle-food. Owing to the imperfect removal at the tables or gutters a marked percentage of the starch instead of being separated and detained escapes with the tailings and becomes wholly lost, except so far as it remains an ingredient of the gluten meal at inferior value. The invention seeks to reclaim this waste starch from the tailings and results besides in producing a gluten residue of more condensed type bearing in its make-up a much higher content of proteids than is usual.

By preference the tailings to be treated are taken in the more concentrated state—i. e., after the water excess has been removed at the settling-tanks. The charge is placed in a convenient grain cooker or converter common to distilleries or breweries and some diastatic agent—e. g., barley-malt—is supplied in quantity sufficient to convert the starch present into maltose. Ordinarily the malt is divided into two portions, which are added separately. After admixture with, e. g., one to five per cent. of the finely-ground malt representing the first portion of the addition the selected tailings are slowly heated in the vessel until the charge attains the desired temperature—e. g., 180° to 230° Fahrenheit— sufficient to disrupt and gelatinize the starch-cells. The malt promotes disruption of the cells and in minor degree effects starch conversion with consequent addition of water to the mass. After the starch becomes gelatinized the charge is cooled down to, e.g., 140° Fahrenheit, when the second portion— e.g., two to ten per cent. of the malt addition— is stirred in, the temperature being then maintained at a point best suited for the quick action of the diastase contained in the malt. Once the desired conversion of the starch is practically accomplished the temperature is raised, e.g., to boiling for final destruction of the diastase, after which the hot charge is run through any of the ordinary filters, presses, &c., to separate the maltose in solution from the solid residue. The maltose solution, which constitutes the filtrate, may be purified, if desired, and is evaporated in familiar fashion to effect recovery. The solid residue left on the filters is either admixed wet with bran to form a cattle-food or else is dried and ground to make gluten meal. It is seen that this residue, being freed from starch, shows a much higher percentage of proteids present and contains besides the albuminoids from the malt which enter as a distinct addition not to be found in the ordinary gluten meal.

Instead of dividing the malt addition into two portions to be separately supplied to the tailings charge it is feasible to heat the tailings alone at the outset until the contained starch is properly gelatinized and thereafter to stir in the malt entire as a single addition when the charge has become properly cooled down. Such modified procedure compels a longer and perhaps a higher heating of the charge before gelatinization of the starch is fully attained and besides requires the charge to be used with more water present than were the tailings taken immediately after settling had been effected at the gravity-tanks. To use the tailings before the settling is accomplished means the introduction of a superfluous volume of water which must be gotten rid of later on. Hence the portion-wise addition of the malt and the selection of the settled tailings is to be preferred, especially so since the first malt addition speeds gelatinization at lower temperature and by incipient conversion of some of the starch contributes enough water to avoid pastiness in the batch under treatment.

In lieu of the malt it is quite feasible to employ the watery extract of malt bearing the diastase in solution; but the employment of any such substitute is unadvisable, since the malt after extraction is left wasted, while the gluten residue finally obtained is deprived of the separate albuminoids distinctive of the malt when used bodily. No acid can be taken as a malt equivalent, for the reason that the acid converts the starch into dextrose instead of into maltose. Moreover, the acid dissolves out some of the albuminoids, while it leaves those which remain in less digestible state.

The temperatures and proportions of ingredients stated are given for guidance merely and are not to be deemed exclusive. Variations in procedure according to the mechanic's skill fall equally within the scope of the advance.

Having thus described my invention, what I claim as new, and desire to secure by Letters Patent, is—

1. In the manufacture of corn-starch by crushing the maize-kernels, floating off the husks and germs, regrinding the kernels and washing away the associated gluten as tailings from the detained starch granules, the process of utilizing such tailings which consists in heating the same to gelatinize the starch remnant, digesting the charge with malt at proper temperature for conversion of said starch, isolating the resultant solution for economic recovery of the contained maltose and finally removing the separated gluten residue in condensed form characterized by the presence of a higher content of proteids than usual, substantially as described.

2. In the manufacture of corn-starch by crushing the maize-kernels, floating off the husks and germs, regrinding the kernels and washing away the associated gluten as tailings from the detained starch granules, the process of utilizing such tailings which consists in separating the water excess therefrom, heating the charge to gelatinize the starch remnant in the presence of a preliminary malt addition, digesting the mass at proper temperature with the final malt addition for conversion of such starch, and isolating the resultant solution to recover the maltose, thus leaving the separated gluten residue in condensed form characterized by the presence of a higher content of proteids than usual, substantially as described.

EDWARD GUDEMAN.

Witnesses:
JAMES H. PEIRCE,
ALBERTA ADAMICK.